Oct. 15, 1957  R. L. KELSO ET AL  2,809,824
TORCH METAL CUTTING MACHINE
Filed June 6, 1955  3 Sheets-Sheet 3

INVENTORS.
R. L. KELSO
B. G. PETERSON
BY
ATTORNEY

# United States Patent Office 2,809,824
Patented Oct. 15, 1957

2,809,824

TORCH METAL CUTTING MACHINE

Robert L. Kelso and Boyd G. Peterson, Chula Vista, Calif., assignors to Rohr Aircraft Corporation, Chula Vista, Calif., a corporation of California Application June 6, 1955, Serial No. 513,356

4 Claims. (Cl. 266—23)

This invention relates to a machine for cutting metal members to predetermined shapes by means of a hot flame.

An object of the invention is to provide a flame-cutting machine for cutting a metal member to a predetermined shape as controlled by a template which may be any one of a large number of shapes.

Another object is to provide a machine of the type described in which two or more pieces of the same shape may be simultaneously cut from a metal member.

A further object is to provide such a machine in which two pieces of entirely different shapes may be simultaneously cut from a metal member.

Another object is to provide a flame-cutting machine with a template support which is easily accessible to the operator and to which the template, which controls the shape of the cut, may be quickly attached or detached.

A further object is to provide, when a long straight member is to be cut, a series of rollers adapted to support the member while it is moved into cutting position and while the cutting is proceeding.

Further objects will become apparent as the description of the machine proceeds. For a better understanding of the invention, reference is made to the accompanying drawing, in which.

Figure 2:
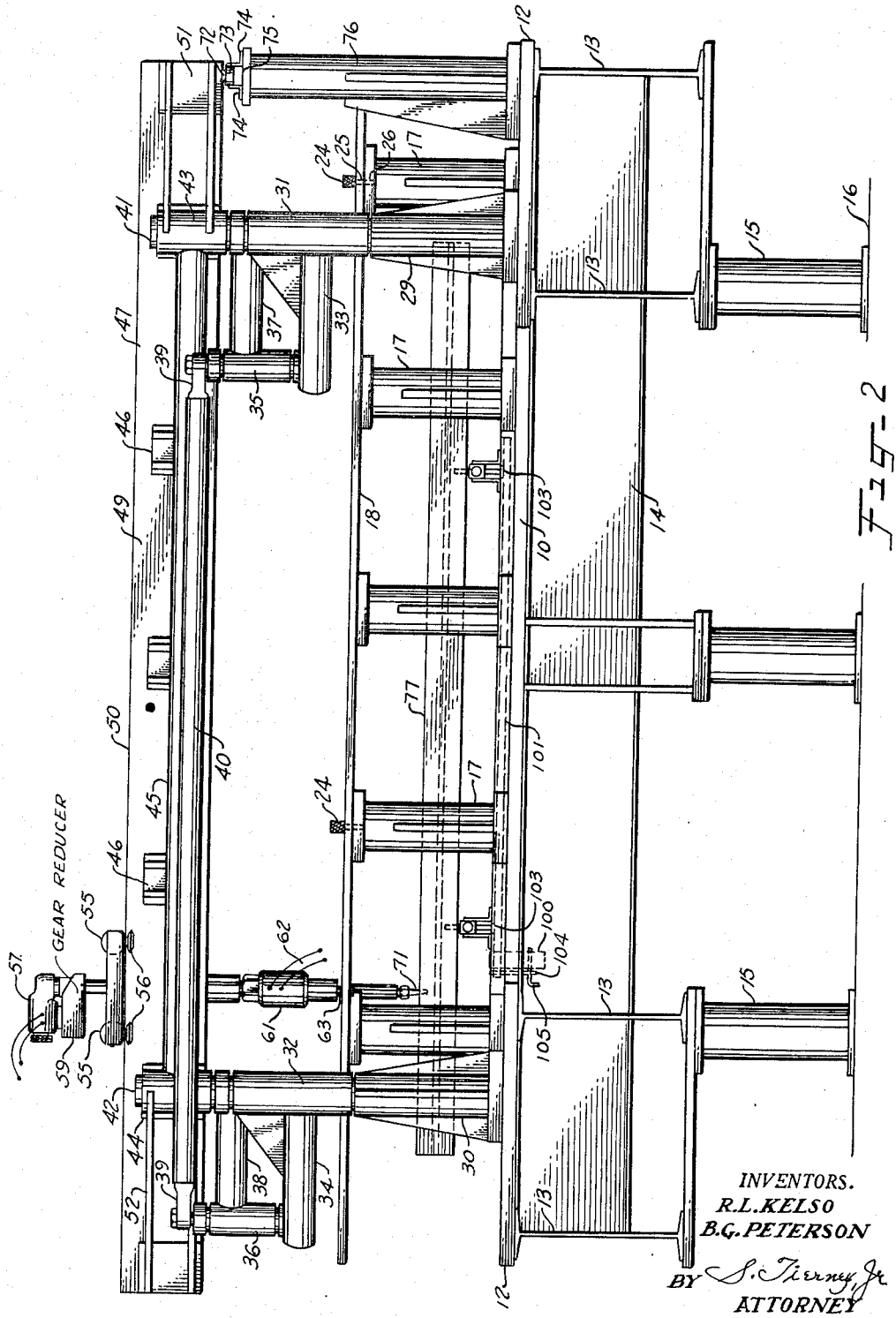
Fig. 2 is a front view of the machine of Fig. 1, certain parts being omitted for clarity.

The machine comprises a pair of generally rectangular flat main base plates 10, 11 having at each corner an extension 12. Plates 10, 11 rest on a set of transverse I beams 13 and also on two longitudinal I beams 14, these several beams resting on a plurality of columns 15 which in turn rest on floor 16. Secured to the top of plate 10 are five aligned standards 17 whose top faces are at the same level and support a rigid flat template 18. Template 18 has a vertical face 19 of predetermined contour which determines the shape of the workpiece 20 to be cut. On the opposite side of the machine five similar standards 17 support a second template 21 having a vertical face 22 of predetermined contour which determines the shape of the workpiece 23 to be cut. Each template is held in a predetermined position on the machine by two similar locating pins 24 which have cylindrical ends entering the aligned holes 25, 26 in the template and standard respectively (see Figs. 2 and 3).

A pair of similar pantograph mechanisms support a pair of similar torches 27, 28 for movement longitudinally of the machine along paths corresponding to the contours of template faces 19 and 22. Each pantograph comprises vertical posts 29, 30 whose lower ends are secured to extensions 12, and which pivotally support a pair of sleeves 31, 32 to which are secured the lever arm 33, 34 of equal length. The latter pivotolly support a pair of sleeves 35, 36 to which are secured the equal lever arms 37, 38. The tops of sleeves 35, 36 are pivotally connected to the ends 39 of a long connecting rod 40. The ends of arms 37, 38 carry pivot pins 41, 42 which are surrounded by short vertical sleeves 43, 44 welded to the ends of a long track-supporting tube 45. Tube 45 has welded thereto a plurality of brackets 46 having aligned vertical faces to which is attached a thin straight track 47 having parallel inner and outer faces 48, 49 and a straight top face 50. The ends of track 47 are attached to a pair of long brackets 51, 52 which are welded to sleeves 43, 44 respectively.

Torches 27, 28 are carried by a pair of similar carriages 53, each carriage being supported by and movable along a track 47. Each carriage has a pivotally supported roller 54 which engages the inner track face 48, two spaced apart rollers 55 having cylindrical faces which rest on top face 50 of the track and a pair of rollers 56 which engage outer track face 49. These rollers are the only portions of the carriage which engage the track so each carriage moves easily along its track. Each carriage is driven by a small electric motor 57 mounted thereon, the motor being supplied with current by flexible leads 58. The motor drives a gear reducer 59 (Fig. 3) which in turn rotates a vertical steel shaft 60 which passes through a magnetizing coil 61 supplied with direct current by flexible leads 62. Shaft 60 terminates in a cylindrical steel tracer 63 whose surface may be knurled or otherwise roughened to minimize slippage with the face 19 or 22 of the template. The carriage also has an extending arm 64 to the end of which is attached a sleeve 65 within which the torch is vertically adjustable. To effect this adjustment a rack 66 is secured to one face of the torch and the rack is raised or lowered by a pinion 67 (see Figs. 3 and 4). The pinion is secured to a shaft journaled in sleeve 65 and this shaft rotated by a circular knob 68 secured thereto. Each torch has the usual mixing chamber (not shown) to which oxygen and acetylene under pressure are supplied through rubber hoses 69, 70, the hot gases being directed against the workpiece by the tip 71 of the torch.

Figure 1:
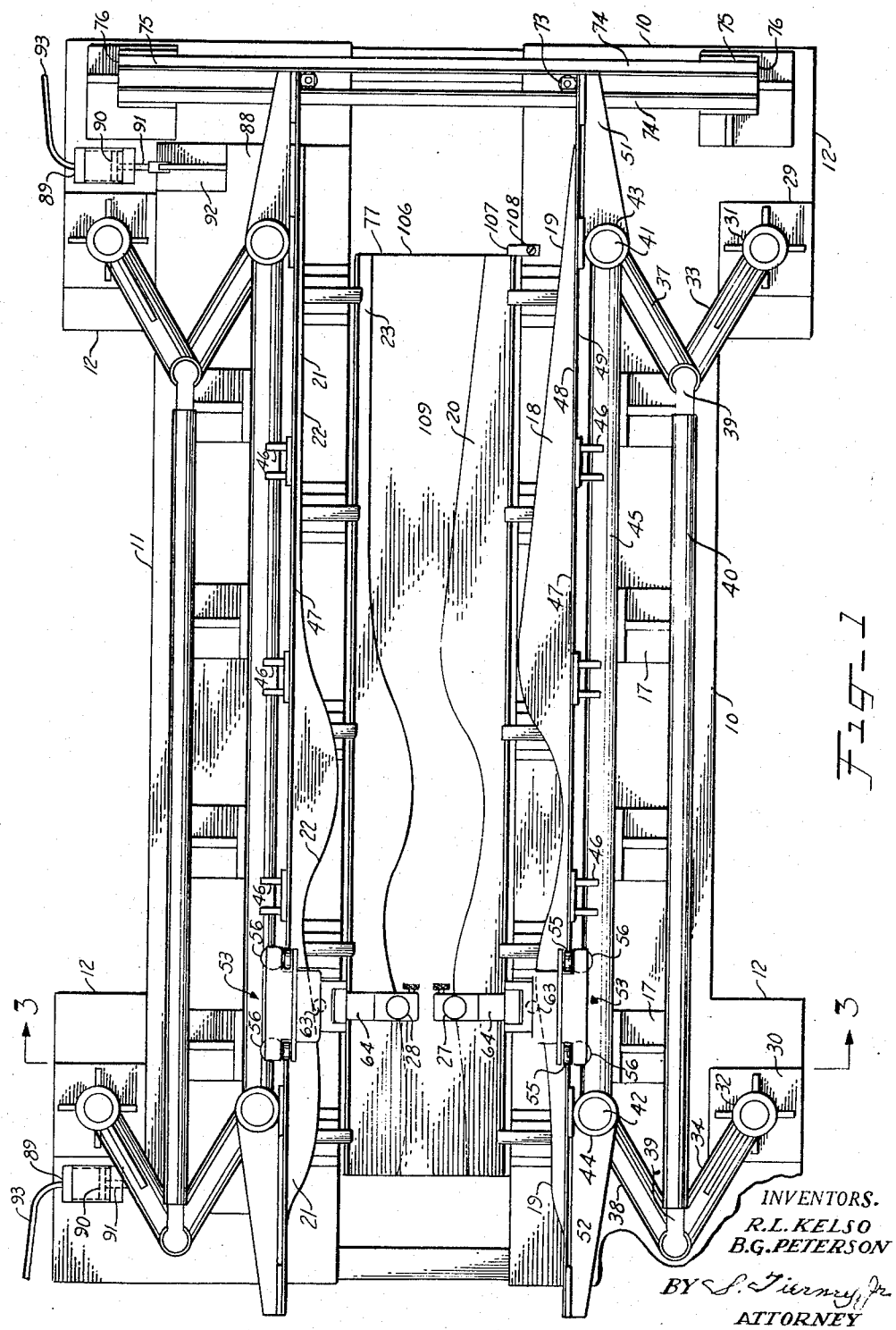
Fig. 1 is a top view of a machine embodying the invention some minor parts being omitted for clarity.

It is preferred to prevent longitudinal movement of track 47 as it moves transversely of the machine and this is accomplished as follows. Each bracket 51 at its end carries a short vertical pin 72 (see Figs. 1, 2) on whose lower end a roller 73 is rotatably supported. The roller engages two straight angle irons 74 which are secured to the level top faces 75 of a pair of columns 76 whose lower ends are secured to base plate extensions 12. Since the angle irons are disposed in parallel planes normal to the vertical plane through each track 47, no endwise movement of a track is permitted.

To support the workpiece (see Fig. 3), shown as an I beam 77 with its web horizontal, a plurality of aligned brackets 78 are secured to plate 10, each bracket carrying a pivotally mounted roller 79 having a cylindrical face on which one flange of the beam rests. Each bracket also has a projecting locating boss 80 and a clamp comprising a lever 81 pivoted on a pin 82. The inner end of lever 81 presses down on the flange of the beam when pressure fluid is supplied by a hose 84 to the interior of a cylinder 83 secured to bracket 78. A piston 85 slidable within cylinder 83 is connected by rod 86 to the outer end of lever 81.

Figure 3:
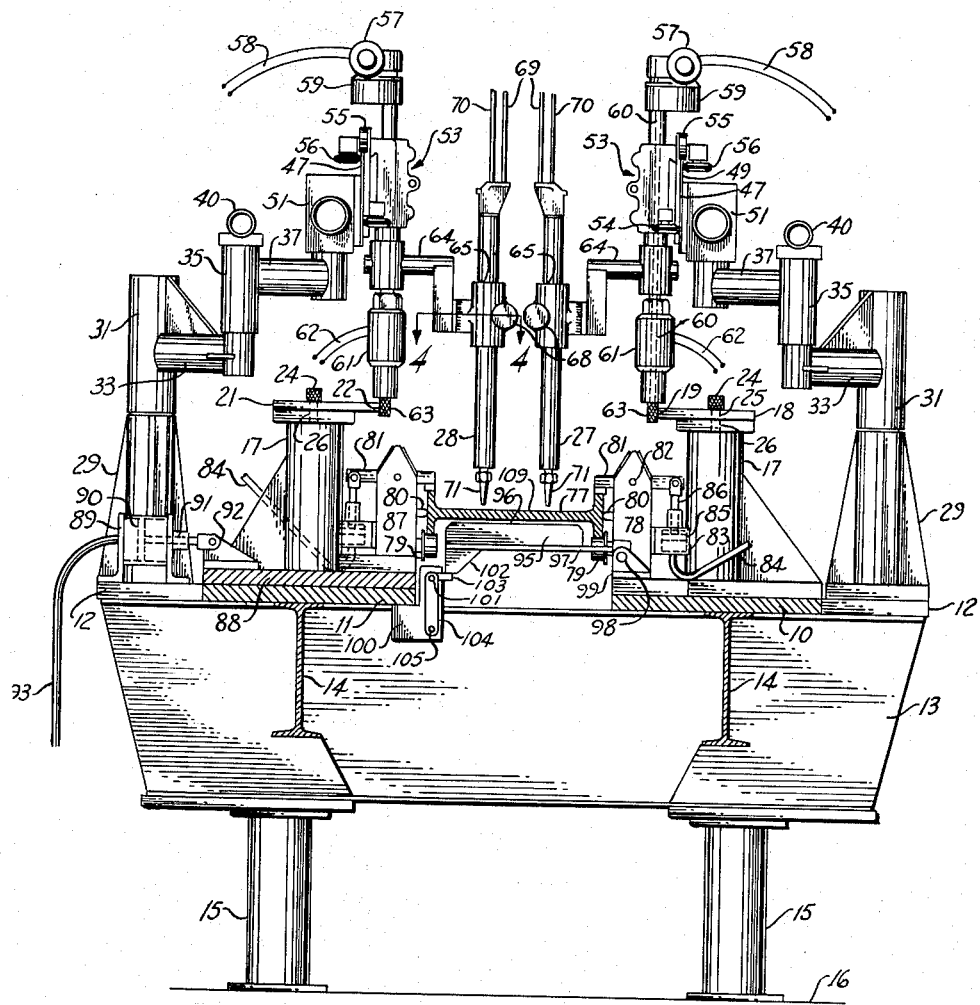
Fig. 3 is a partial section of the machine taken approximately on line 3—3 of Fig. 1.

A second set of brackets 87 similar to brackets 78 and having similar clamp structure are secured to a flat plate 88 slidable transversely of the machine on plate 11. Plate 88 may have depending flanges (not shown) which project into correspondingly shaped transverse guideways in plate 11 which guide plate 88 and prevent lengthwise movement thereof. To move plate 88 two cylinders 89 are mounted on two extensions 12, each cylinder containing a piston 90 which is connected by a rod 91 to a block 92 whose base is secured to plate 88, as shown in Fig. 3. Pressure fluid is supplied to both cylinders 89 by hoses 93 from a common source (no shown).

To support the central portion of beam 77 (Fig. 3) which is cut away by the flames two or more similar supports 94 are provided, each support comprising a thin plate 95 whose top face 96 is a short distance below the web. Plate 95 forms portion of an arm 97 pivoted at 98 to a bracket 99 attached to plate 10. Secured to the bottom of plate 11 are spaced apart brackets 100 through which passes a long rotatable shaft 101. Each arm 97 has a depending portion 102 adapted to normally rest on a short catch 103 secured to shaft 101. The end of shaft 101 has a release arm 104 secured thereto, this arm being retained in normal position by a short pin 105 which is passed into registered holes in the end bracket 100 and arm 104.

Figure 4:
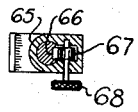
Fig. 4 is a sectional view on line 4—4 of Fig. 3 showing means for adjusting the height of a cutting torch.

Starting with plate 88 in its outer position, to operate the machine one end of the beam channels is placed on two of the rollers 79 and the beam pushed into the machine thereby causing it to travel along the several rollers until its leading end 106 (Fig. 1) abuts a short stop 107 secured to plate 10 by a screw 108. Air pressure is now admitted to cylinders 89 through hoses 93, thereby causing plate 88 to move toward the beam and the bosses 80 on brackets 87 to push the opposite flange of the beam against the bosses 80 on brackets 78. The beam is now centered in the machine and is clamped in this position by admitting compressed air to hoses 84. This causes pistons 85 to move up and cause the ends of levers 81 to press down against the beam flanges and secure the beam in a predetermined position on the machine. The carriages 53 are run along the tracks 47 to bring the torches 27, 28 a short distance past the end 106 of the beam. Oxygen and acetylene are now admitted to the hoses 69—70 and the flames ignited. If the spacing between torch tips 71 and the beam needs adjusting, this is done by rotating the adjusting knobs 68 (Fig. 4). Each carriage 53 with its track is then manually moved transversely to bring the tracers 63 against the faces 19, 22 of the templates 18 and 21. Current is then supplied to leads 62 to magnetize coils 61 and tracers 63. Current is then supplied to leads 58 and motors 57, the rotation of the motors causing the tracers 63 to rotate slowly and advance the carriages 53 along their tracks. Due to the tracers being magnetized they are pulled strongly toward the steel templates, so that the tracers follow the curves 19, 22 and cause the flames from torch tips 71 to burn narrow slots through the web of beam 77 which correspond in shape to curves 19 and 22. As the carriages move along the tracks 47, they move the entire tracks transversely of the machine, the tracks remaining parallel to each other due to the pantograph lever systems described which support them. When the torches pass the opposite end of the beam, it will be clear that two workpieces 20 and 23 of the desired shapes have been cut from the sides of the beam. The center portion 109 of the beam web which has been cut loose will rest on the plates 95 (Fig. 3). The current to leads 58, 62 is now shut off and also the gas supplies to the torches 27, 28. The air supply to hoses 84 is now shut off causing the levers 81 to release the flanges of the beam. The finished workpieces 20, 23 may now be pulled lengthwise out of the end of the machine, rolling along their supporting rollers 79. The waste portion 109 of the beam is now removed by withdrawing pin 105 (Fig. 3), rotating release arm 104 to release catches 103 from the pivoted arms 97, permitting these arms to drop down and release beam portion 109. Arms 97 may be returned to their horizontal positions by springs (not shown) connected to them and plate 10.

While the workpiece cut has been illustrated as an I beam, it will be understood that the machine is adapted to cut long metal members of any shape which may not have flanges thereon as, for example, long flat plates.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described our invention, what we claim as new and useful and desire to secure by Letters Patent is:

1. Means adapted to cut a workpiece having flanges extending along the sides thereof into two flanged edge portions of predetermined contours comprising, in combination: a main frame having a central opening therein longer than the workpiece and wide enough to pass the central portion cut from the workpiece; a plurality of spaced apart rollers above said opening and on which the beam flanges are adapted to rest; a pair of long parallel straight tracks above the workpiece; a pair of pantograph devices connecting said tracks to said frame, said devices being constructed and arranged to cause said tracks to remain parallel while approaching each other; carriages supported by and movable along said tracks; torches carried by said carriages and arranged to direct hot flames onto spaced apart lines extending lengthwise of the workpiece; a pair of templates supported by said frame under said carriages, said templates having long guiding faces of predetermined different contours; tracers carried by said carriages and arranged to engage successive regions of said guiding faces in response to simultaneous movement of the carriages along said tracks; and a plurality of spaced apart supports extending up into said central opening, the tops of said supports being spaced a short distance below the central portion of the uncut beam in readiness to receive and support said central portion when severed by said hot flames.

2. Cutting means as claimed in claim 1, in which said supports are mounted for withdrawal from said central opening to permit the severed central portion of the workpiece to descend through the central opening under the action of gravity.

3. Means for cutting a long metal workpiece comprising, a main frame; means on said frame for supporting the workpiece; a straight track longer than the workpiece and at a level higher than the workpiece; a plurality of spaced apart movable supports connecting said frame and track, said supports being arranged and constructed to permit the track to move freely from an initial position in a direction transverse to its length while causing the track to remain parallel to its initial position; a carriage supported by and movable along said track; a torch supported by said carriage and arranged to direct a hot flame down onto the workpiece; a template mounted on said frame under said carriage, said template having a long guiding face of predetermined contour; a member supported by said frame and having a guide face normal to the plane of said track; a roller associated with said track and in contact with said guide face; and a tracer carried by said carriage and arranged to engage successive regions along said template guiding face in response to the movement of the carriage along said track.

4. Means adapted to cut a workpiece to simultaneously provide two edge portions of predetermined contours comprising, in combination: a main frame having a central portion adapted to support the workpiece; a pair of long parallel straight tracks above the workpiece; a plurality of spaced apart movable supports connecting said frame and tracks, said supports being constructed and arranged to cause said tracks to remain parallel while approaching each other; carriages supported by and movable along said tracks; torches supported by said carriages and arranged to direct hot flames onto spaced apart regions of the workpiece; a pair of templates mounted on said frame under said carriages, said templates having long guiding faces of predetermined contour; a member disposed transversely of said tracks and cooperating therewith to prevent lengthwise movement of said tracks; and tracers carried by said carriages and arranged to engage successive regions of said template guiding faces in response to simultaneous movement of the carriages along said tracks.

References Cited in the file of this patent

UNITED STATES PATENTS

| | | |
|---|---|---|
| 2,038,820 | Anderson | Apr. 28, 1936 |
| 2,269,636 | Mott | Jan. 13, 1942 |
| 2,317,526 | Hayes | Apr. 27, 1943 |
| 2,388,376 | Young | Nov. 6, 1945 |
| 2,405,945 | Ehemann | Aug. 20, 1946 |